United States Patent
Burrow et al.

(10) Patent No.: US 10,232,819 B2
(45) Date of Patent: Mar. 19, 2019

(54) SEATBELT WEBBING RETRACTOR AND METHOD OF ASSEMBLY

(71) Applicant: Autoliv ASP, Inc., Ogden, UT (US)

(72) Inventors: Jon E. Burrow, Ortonville, MI (US); Jonathon Boughner, Lake Orion, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 83 days.

(21) Appl. No.: 15/255,928

(22) Filed: Sep. 2, 2016

(65) Prior Publication Data

US 2018/0065594 A1  Mar. 8, 2018

(51) Int. Cl.
*B60R 22/34* (2006.01)

(52) U.S. Cl.
CPC ...... *B60R 22/34* (2013.01); *B60R 2022/3402* (2013.01)

(58) Field of Classification Search
CPC ............ B60R 22/34; B60R 2022/3402
See application file for complete search history.

(56) References Cited

U.S. PATENT DOCUMENTS

| 2011/0215185 A1* | 9/2011 | Clute | ............ B60R 22/3413 242/374 |
| 2012/0049500 A1* | 3/2012 | Wang | ............ B60R 22/4628 280/806 |

FOREIGN PATENT DOCUMENTS

| DE | 10 2013 211 481 A1 | 12/2014 |
| DE | 10 2014 207 294 A1 | 10/2015 |

\* cited by examiner

*Primary Examiner* — John C Hong
(74) *Attorney, Agent, or Firm* — Brinks Gilson & Lione

(57) ABSTRACT

A seatbelt webbing retractor and a method of assembling a seatbelt webbing retractor including a unitary bobbin having a mounting portion, a first and second annular wall extending perpendicularly from a first and second end of the mounting portion, respectively. The mounting portion of the unitary bobbin defines a plurality of slots through which the seatbelt webbing is passed. The seatbelt webbing retractor also includes a spindle extending through the mounting portion of the unitary bobbin and a retractor frame to which the spindle is mounted. The unitary bobbin is rotatable with respect to the retractor frame and an outer surface of the unitary bobbin is configured to be wrapped with the seatbelt webbing.

20 Claims, 8 Drawing Sheets

SEATBELT WEBBING RETRACTOR AND METHOD OF ASSEMBLY

TECHNICAL FIELD

The technical field relates generally to seatbelt restraint devices for restraining an occupant of a vehicle, and more particularly, to a seatbelt webbing retractor and a method of assembly.

BACKGROUND

The statements in this section merely provide background information related to the present disclosure and may not constitute prior art.

Seatbelt systems for restraining a motor vehicle occupant play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further, act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

Another general type of occupant restraint system are so-called inflatable restraint systems which include frontal impact airbags as well as inflatable side impact devices such as lower torso airbags and so-called inflatable side curtain airbags. Inflatable restraint systems coupled with seatbelt systems provide motor vehicle occupants with an unprecedented level of impact protection. However, vehicle manufacturers and safety system suppliers continuously strive for further advancements in occupant protection.

An occupant protection system which has been described and developed but is only presently in limited use are so-called inflatable seatbelts or "beltbag" systems. These systems essentially combine features of an active seatbelt system and an inflatable restraint. An inflatable sleeve is positioned on the shoulder belt section of the seatbelt between the seatbelt webbing and the occupant. In normal use, the system is operated like a typical seatbelt restraint systems. However, upon a detected vehicle impact or an imminent impact, a compressed gas or pyrotechnic inflator is activated to supply gas to the inflatable sleeve. The elongated inflated sleeve deploys between the belt and the occupant and serves several functions including acting essentially as a pre-tensioner by reducing slack between the seatbelt and the occupant, enhancing the restraint effect offered by the seatbelt, and also distributing restraint forces acting on the occupant as the occupant is restrained. Beltbag systems are presently primarily provided for rear seat occupants of certain vehicles. Frontal impact airbags are difficult to provide for rear seat occupants and beltbag systems can be implemented for those seating positions to enhance occupant protection as compared with traditional belt restrains.

Beltbag systems pose significant design challenges. The webbing with multiple layers forming the inflatable sleeve make the belt very thick which requires a very large retractor for storing the rolled-up belt. Moreover, an inflation gas communication path between the inflator and the inflatable portion of the belt bag needs to be provided. Typically the inflator is mounted to the roof rail or upper shoulder belt attachment and a duct is provided which communicates with the inflatable sleeve. Another challenge is protecting the webbing and sleeve combination as it is stored on a belt retractor spool. Because of the thickness and relative lack of suppleness of the layered belt assembly the rolled up belt creates a larger diameter, uneven roll. Due to these factors, manufactures provide protective, guide walls on the retractor spool, in the form of a bobbin, to contain and guide the webbing which reduces wear on the edges of the webbing from rubbing against internal surfaces of the retractor where they are subject to wear and possible damage. Such walls also help contain the webbing roll within the retractor system despite the tendency of the webbing to roll unevenly.

Some beltbag webbing retractors have included bobbins having two separate pieces that must be joined together around a spindle of the webbing retractor. The joining of these two pieces often requires providing a complex snap system between the two separate parts, which increases manufacturing cost and complexity while also increasing the weight of the bobbin. Additionally, a strap or tape is often applied to the wrapping surface of the bobbin to further hold the two pieces of the bobbin together. Despite these efforts to hold the two pieces of the bobbin together, the two pieces of the bobbin may become separated and fall off the spindle while in use or may become loose and rattle, thereby producing undesirable noise.

Additionally, once these two-piece bobbins are assembled around the spindle, it is difficult to assemble the bobbin and spindle within the retractor frame. With two-piece bobbins it is also difficult to ensure flatness of the guide walls particularly where the sections join, which can lead to the bobbin rubbing against the retractor frame resulting in unpredictable wear, pinching during webbing extraction and retraction, and undesirable noise during operation. Finally, a rib is formed where the two pieces of the bobbin are joined together, which can cause abrasion on the webbing and lead to webbing failure.

In the automotive industry, there is a constant effort to reduce the cost and weight of vehicle components while also improving the ease of manufacturing and assembly. This invention is related to a seatbelt webbing retractor and assembly method having an improved bobbin for the applications described.

SUMMARY

The present invention provides a seatbelt webbing retractor and assembly method that addresses the above-noted problems of the related art while also increasing ease of assembly and reducing the cost and weight of manufacturing.

The seatbelt webbing retractor of the present invention includes a unitary bobbin having a mounting portion, two annular walls extending perpendicularly from a first and second end of the mounting portion. The mounting portion of the unitary bobbin defines a plurality of slots through which the seatbelt webbing is passed. The seatbelt webbing retractor also includes a spindle extending through the mounting portion of the unitary bobbin and a retractor frame to which the spindle is mounted. The unitary bobbin is rotatable with respect to the retractor frame and an outer surface of the unitary bobbin is configured to be wrapped with the seatbelt webbing.

The present invention also provides method of assembling a motor vehicle seatbelt retractor, including inserting a spindle into a mounting portion of a unitary bobbin, radially aligning a spindle webbing slot with a bobbin webbing slot by inserting a tongue formed on an exterior surface of the spindle into a groove formed on an interior surface of the mounting portion, axially aligning the spindle within the mounting portion of the unitary bobbin by nesting a mating surface of the spindle into a recess in an annular wall that extends perpendicularly from the mounting portion of the bobbin, and locking the spindle axially within the mounting portion of the unitary bobbin by snapping a ridge that extends from the interior surface of the mounting portion into a corresponding groove on an exterior surface of the spindle.

The seatbelt webbing retractor and assembly method of the present invention eliminates the risk of the bobbin separating and the need for additional components and steps to join and hold two pieces of a bobbin together. Additionally, the unitary bobbin of the seatbelt webbing retractor of the present invention allows the spindle of the retractor to be a simplified cylindrical shape resulting in a stronger, more resilient spindle. Finally, the seatbelt webbing retractor and assembly method of the present invention result in reduced component rattle, wear, and cost, and increased component durability and ease of manufacture and assembly.

These and other features and advantages of this invention will become apparent upon reading the following specification, which, along with the drawings, describes preferred and alternative embodiments of the invention in detail.

BRIEF DESCRIPTION OF THE DRAWINGS

This invention will be further described, by way of example, with reference to the accompanying drawings in which.

Figure 1:
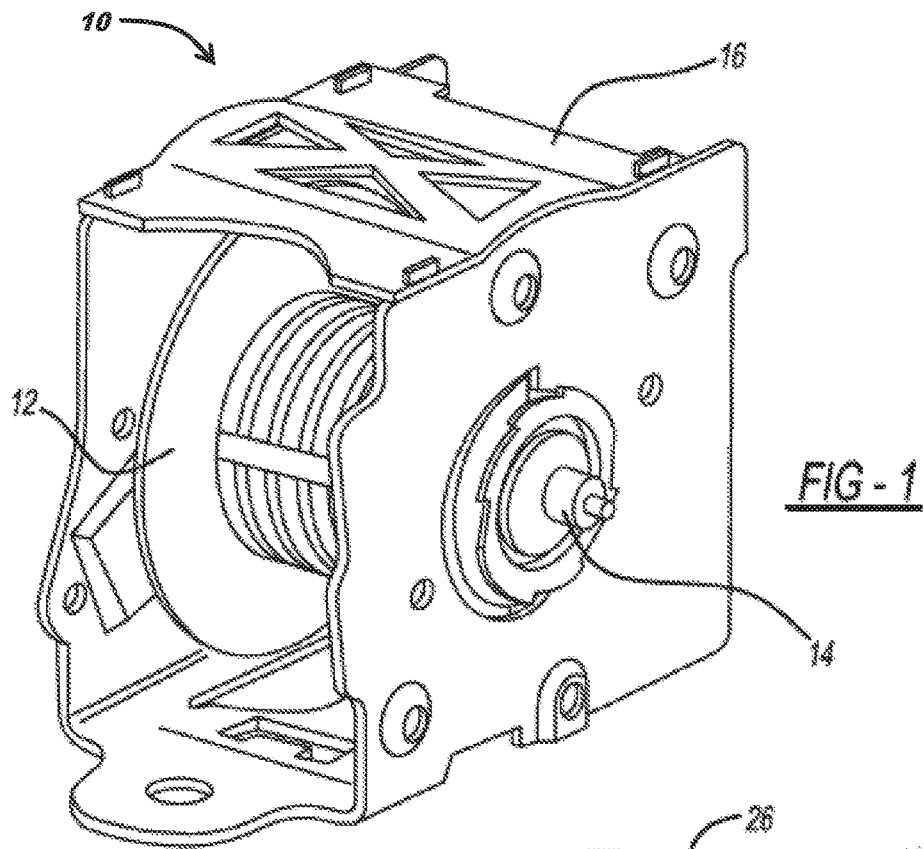
FIG. 1 is a perspective view of a seatbelt retractor according to an embodiment of the present invention.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a seatbelt webbing retractor 10 according to an embodiment of the present invention. The illustrated seatbelt retractor 10 includes a unitary bobbin 12, a spindle 14, and a retractor frame 16. The unitary bobbin 12 may be formed of injection molded plastic or another suitable material. The spindle may be a pretensioning style spindle or a non-pretensioning style spindle, which are both generally known in the art. The retractor frame may be formed of metal, plastic, or another suitably robust material.

Figure 2A:
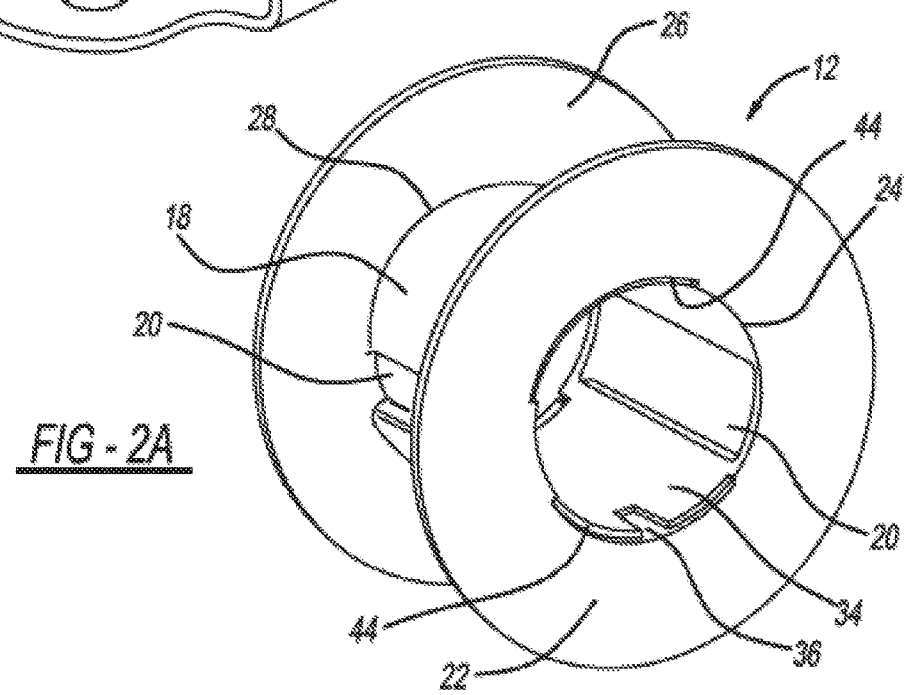
FIG. 2A is a perspective view of a first side of a bobbin component of the seatbelt retractor of FIG. 1.
Figure 2B:
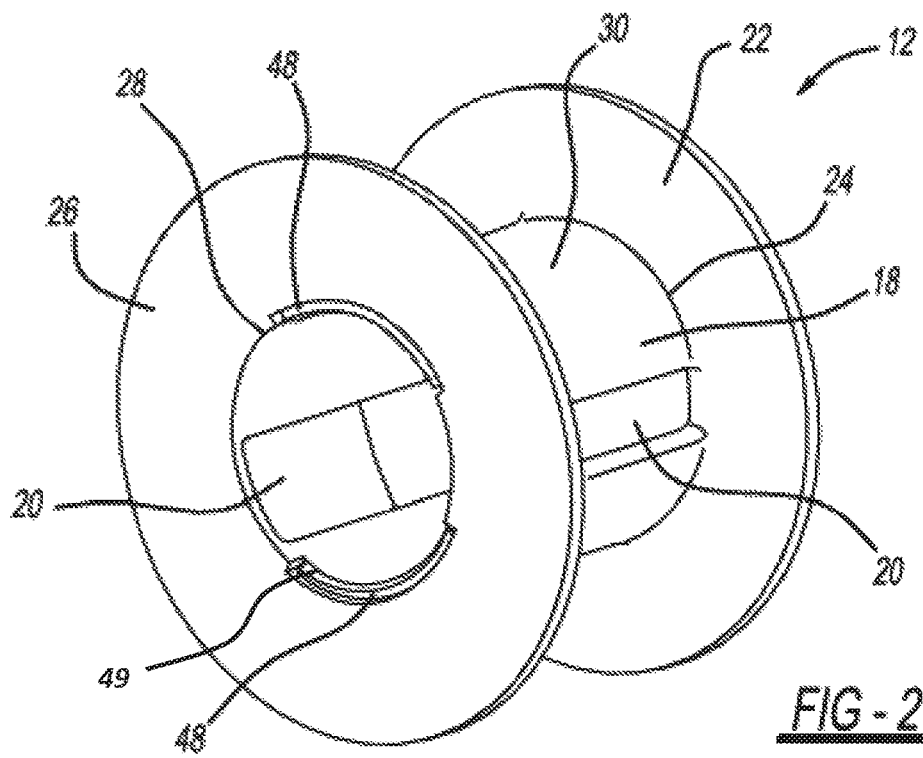
FIG. 2B is a perspective view of a second side of the bobbin component of the seatbelt retractor of FIG. 1.
Figure 3:
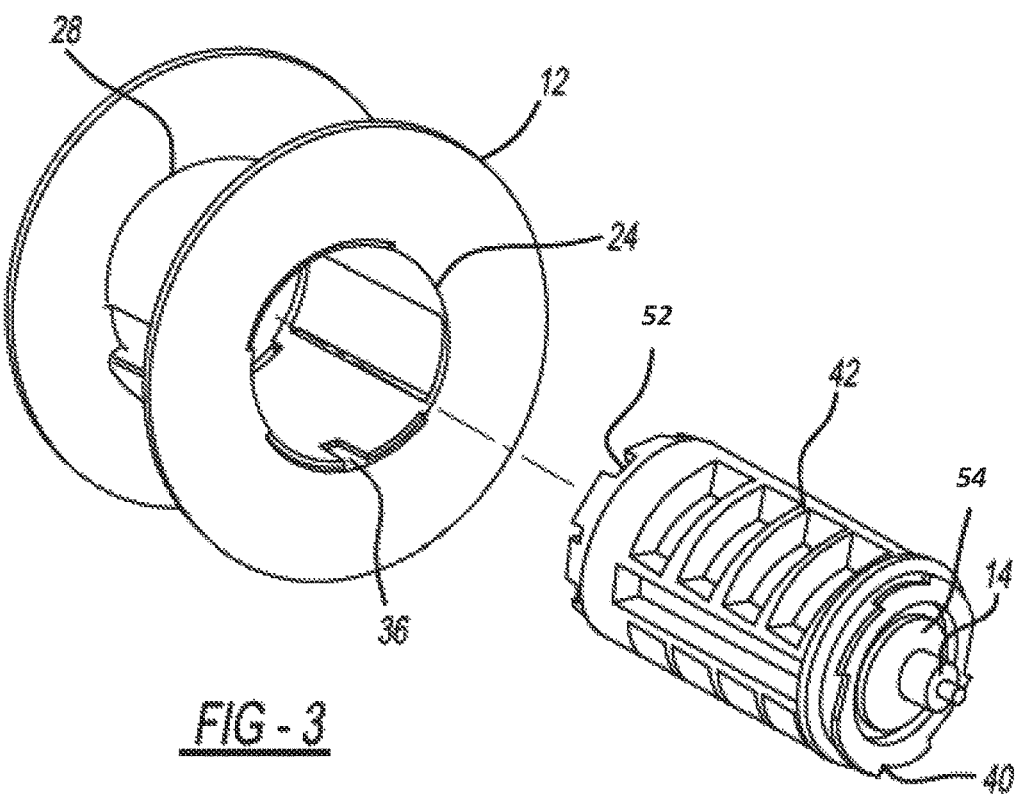
FIG. 3 is a perspective exploded view of the bobbin and a spindle component of the seatbelt retractor of FIG. 1.
Figure 4:
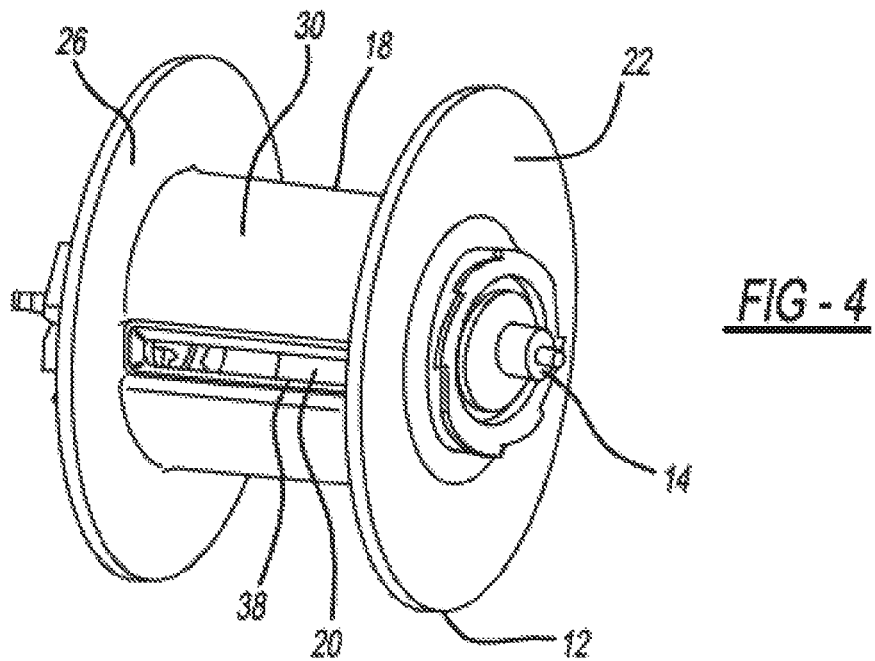
FIG. 4 is a perspective view of the assembled bobbin and spindle of FIG. 3.

As further shown in FIG. 2A and FIG. 2B, the unitary bobbin 12 has a mounting portion 18 which defines a plurality of bobbin webbing slots 20. As shown, the mounting portion 18 has a cylindrical shape. The webbing slots 20 may be formed in the bobbin during the molding process. The unitary bobbin 12 further includes a first annular wall 22 that extends perpendicularly from a first end 24 of the mounting portion 18. A second annular wall 26 extends perpendicularly from a second end 28 of the mounting portion 18. Forming the unitary bobbin 12 as a single piece ensures flatness of these annular walls 22 and 26, thereby easing assembly of the bobbin 12 into the retractor housing 16, which typically has a very tight clearance. The flatness of the annular walls 22 and 26 also reduces or prevents the annular walls 22 and 26 from rubbing against or pinching with the retractor frame 16 during extraction and retraction of the seatbelt webbing 32, thereby reducing rattle and unpredictable wear of the bobbin 12. Furthermore, the annular walls 22 and 26 of the unitary bobbin 12 do not have a rib that two-piece bobbins have at the point where the two pieces are joined together. Eliminating such a rib in the annular walls 22 and 26 prevents undesired rubbing and wear of the edges of the seatbelt webbing 32.

As further shown in FIGS. 1 and 4-6, the spindle 14 extends through the mounting portion 18 of the unitary bobbin 12. An exterior surface 42 of the spindle 14 may abut an interior surface 34 of the unitary bobbin 12. Alternatively, there by a gap between the exterior surface 42 of the spindle 14 and the interior surface 34 (best shown in FIG. 2) of the unitary bobbin 12. The spindle 14 is mounted within the retractor frame 16 such that the unitary bobbin 12 is rotatable with respect to the retractor frame 16. The ends of the spindle 14 may protrude through apertures in the retractor frame 16. Alternatively, the spindle 14 may be completely contained within the retractor frame 16. The retractor frame 16 may be in the shape of a box or alternatively may be a simple yoke.

Figure 5:
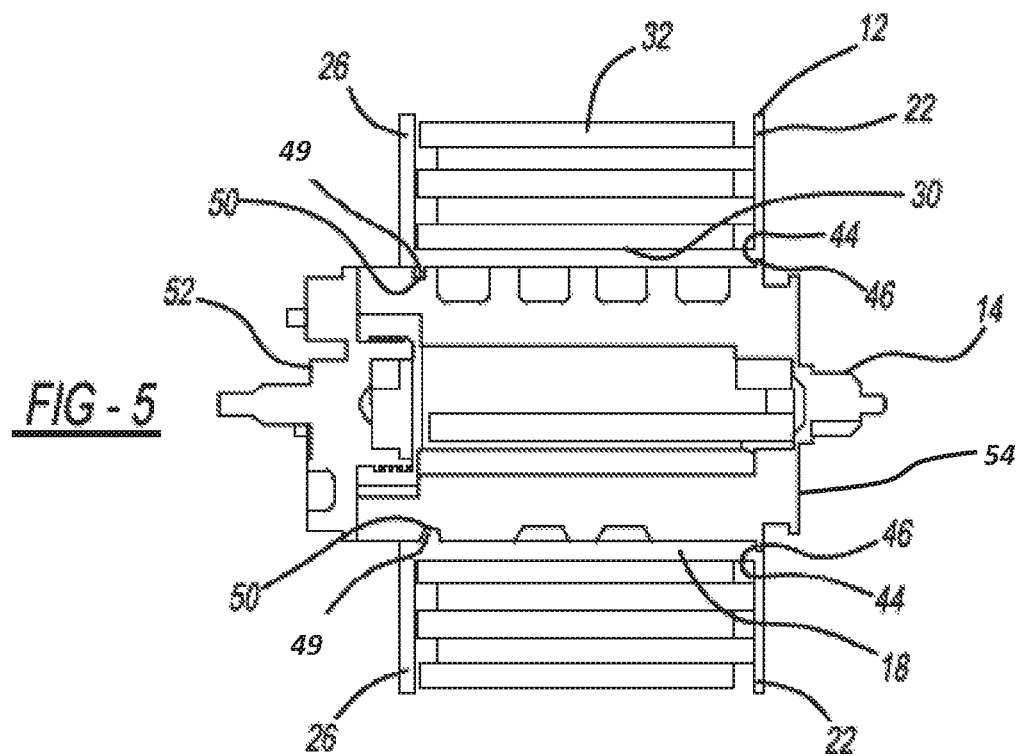
FIG. 5 is a cross-sectional view of the assembled bobbin and spindle of FIG. 4 with seatbelt webbing rolled around the bobbin.

An outer surface 30 of the unitary bobbin 12 is configured to be wrapped with a seatbelt webbing 32, shown in FIG. 5. The outer surface 30 of the unitary bobbin 12 is generally smooth, and unlike two-piece bobbins is formed without a rib. As discussed above, two-piece bobbins typically form a rib where the two pieces are joined together, which can rub on the seatbelt webbing and cause wear. The smooth outer surface 30 of the unitary bobbin 12 eliminates such a rib and the associated rubbing and wear. Eliminating the rib also assists with maintaining a more even roll of the seatbelt webbing 32 as compared to the two-piece bobbins.

The seatbelt webbing 32 may be an inflatable type. As discussed above, inflatable or beltbag seatbelt webbing has multiple layers of material as well as an inflatable bladder or sleeve, which results in a thick seatbelt webbing and a large diameter, uneven roll. The annular walls 22 and 26 of the unitary bobbin 12 protect the seatbelt webbing 32 as it is wrapped around the outer surface 30 of the unitary bobbin 12. The annular walls 22 and 26 prevent the edges of the seatbelt webbing 32 from rubbing against other components of the seatbelt webbing retractor 10. Additionally, the annular walls 22 and 26 guide the seatbelt webbing 32 as it is wrapped and contains the seatbelt webbing 32 within the bobbin 12, thereby accommodating the uneven and large diameter webbing roll.

As best shown in FIG. 2A, the seatbelt webbing retractor 10 includes an anti-rotation feature 36 on an interior surface 34 of the mounting portion 18 of the unitary bobbin 12. The anti-rotation feature 36 is used to align webbing slots 38 (FIG. 4) in the spindle 14 with the webbing slots 20 in the bobbin 12 during assembly and to prevent rotation of the spindle 14 relative to the unitary bobbin 12 during use. As shown, the anti-rotation feature is a groove 36 on the interior surface 34 of the mounting portion 18 and a corresponding tongue 40 on an exterior surface 42 of the spindle 14.

The unitary bobbin 12 may also include a recessed surface 44 on the first annular wall 22 of the unitary bobbin 12. As best shown in FIG. 5, the recessed surface 44 of the unitary bobbin 12 corresponds to a mating surface 46 on a second end 54 of the spindle 14. The mating surface 46 on the spindle 14 nests into the recessed surface 44 on the first annular wall 22 of the unitary bobbin 12 to axially align the spindle 14 within the unitary bobbin 12. When the mating surface 46 is nested or positioned within the recessed surface 44, the spindle 14 is positioned axially within the unitary bobbin 12. The mating surface 46 extends beyond the opening in the first annular wall 22 such that when the mating surface 46 is nested in the recessed surface 44 it prevents the spindle 14 from being passed entirely through the mounting portion 18 of the unitary bobbin 12.

As best shown in FIG. 2B, the unitary bobbin 12 of the seatbelt webbing retractor 10 further includes a snap feature 48 at a second end 28 of the mounting portion 18 of the unitary bobbin 12. The snap feature 48 secures the spindle 14 within the bobbin 12. As shown, the snap feature 48 may be at least one ridge 49 extending from the interior surface 34 of the mounting portion 18. FIG. 5 shows that the ridge 49 snaps into a corresponding groove 50 on the first end 52 of the spindle 14.

Figure 7:
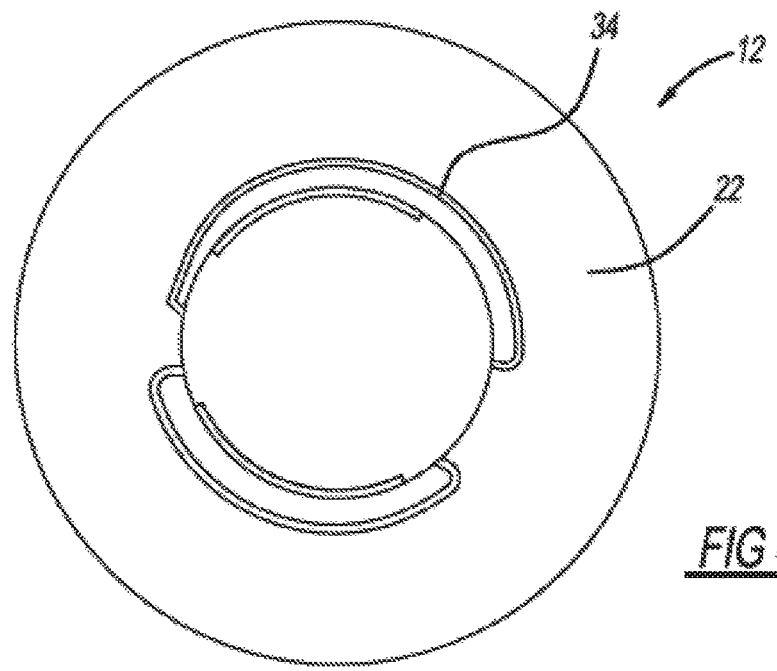
FIG. 7 is a side view of a bobbin component according to an alternate embodiment of the present invention.
Figure 8:
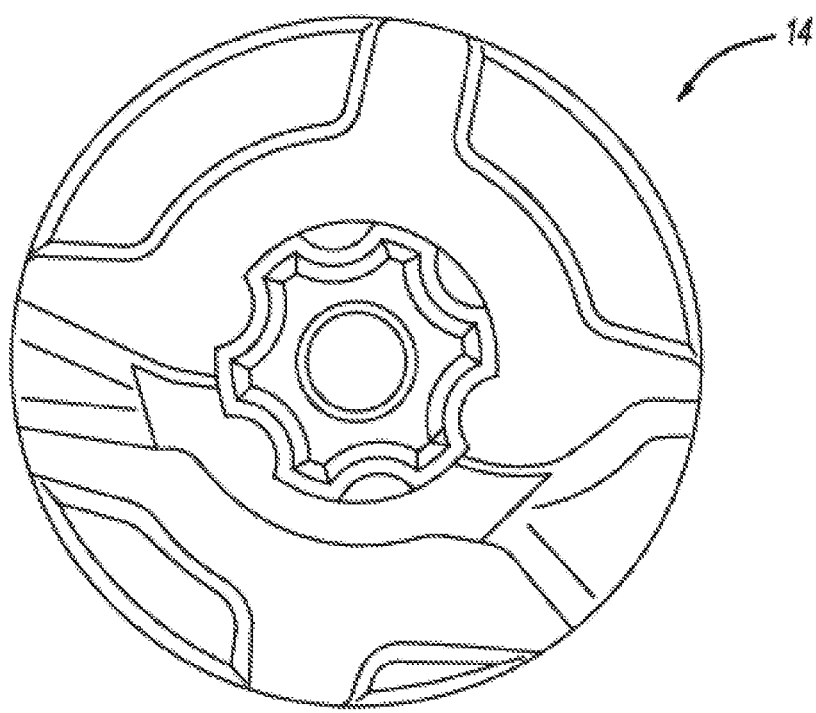
FIG. 8 is a side view of a spindle component according to an alternate embodiment of the present invention.

As shown in FIG. 7, in another embodiment of the present disclosure the interior surface 34 of the mounting portion 18 of the unitary bobbin 12 is helical. When the mounting portion 18 of the unitary bobbin 12 is helical, the spindle 14 may be of a simple cylindrical shape, as shown in FIG. 8. The cylindrical shape of the spindle 14 eliminates the complexity of the spiral shape typically found on spindles. A cylindrically shaped spindle 14 allows the spindle 14 to be stronger and more robust as compared to complex, spiral spindles known in the art. Furthermore, providing a helical mounting portion 18 allows the webbing 32 to be more smoothly wrapped around the mounting portion 18 as compared to a purely cylindrical mounting surface 18 where the extra thickness of the first wrapped layer of webbing 32 produces an unevenness as the webbing is wrapped.

Figure 9:
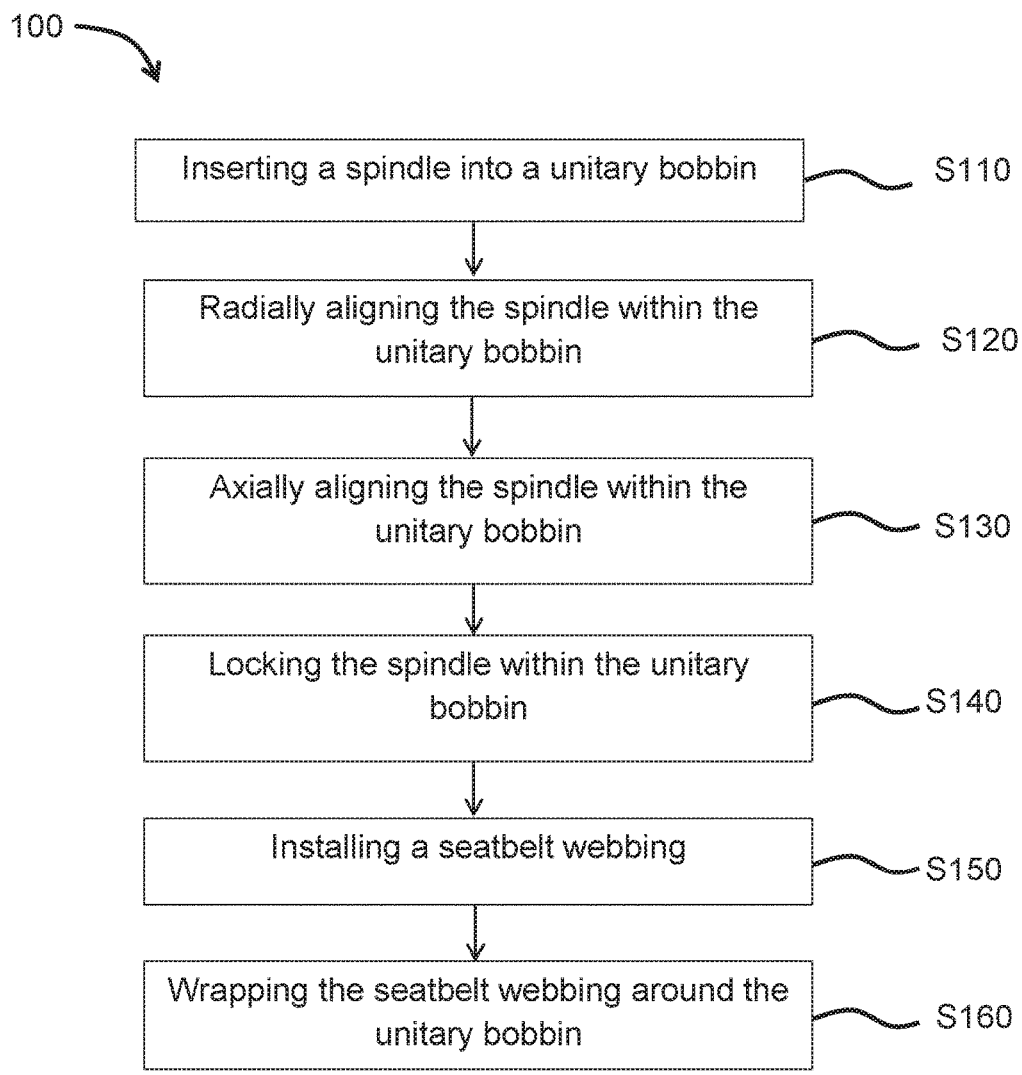
FIG. 9 shows a flowchart of the steps of a method of assembling a seatbelt webbing retractor according to an embodiment of the present invention.

FIG. 9 shows a method 100 of assembling a motor vehicle seatbelt retractor 10, according to an embodiment of the present invention. The method 100 includes inserting a first end 52 of a spindle 14 into a first end 24 of a mounting portion 18 of a unitary bobbin 12 toward a second end 28 of the mounting portion 18 of the bobbin 12 at step S110, radially aligning a spindle webbing slot 38 with a bobbin webbing slot 20 by inserting a tongue 40 formed on an exterior surface 42 of the spindle 14 into a groove 36 formed on an interior surface 34 of the mounting portion 18 at step S120. The cooperation of the tongue 40 formed on the exterior surface 42 of the spindle 14 and the groove 36 formed on the interior surface 34 of the mounting portion 18 prevents the spindle 14 from rotating relative to the unitary bobbin 12. The method 100 also includes axially aligning the spindle 14 within the mounting portion 18 of the unitary bobbin 12 by nesting a mating surface 46 of the spindle 14 into a recess 44 in a first annular wall 22 that extends perpendicularly from the first end 24 of the mounting portion 18 of the bobbin 12 at step S130, and locking the spindle 14 axially within the mounting portion 18 of the unitary bobbin 12 by snapping a ridge 49 that extends from the interior surface 34 of the mounting portion 18 into a corresponding groove 50 in the outer surface 42 of the spindle 14 at step S140.

The assembly method 100 may further include installing seatbelt webbing by passing a seatbelt webbing 32 through the spindle webbing slot 38 and the bobbin webbing slot 20, and securing a first end of the seatbelt webbing 32 within the spindle 14 at step S150. The seatbelt webbing 32 may be inflatable. As demonstrated in FIG. 5, the method 100 may proceed with wrapping the seatbelt webbing 32 around an outer surface 30 of the mounting portion 18 of the unitary bobbin 12 such that the wrapped seatbelt webbing 32 is bordered by the first annular wall 22 that extends perpendicularly from the first end 24 of the mounting portion 18 and by a second annular wall 26 that extends perpendicularly from the second end 28 of the mounting portion 18 of the bobbin 12 at step S160.

Figure 6:
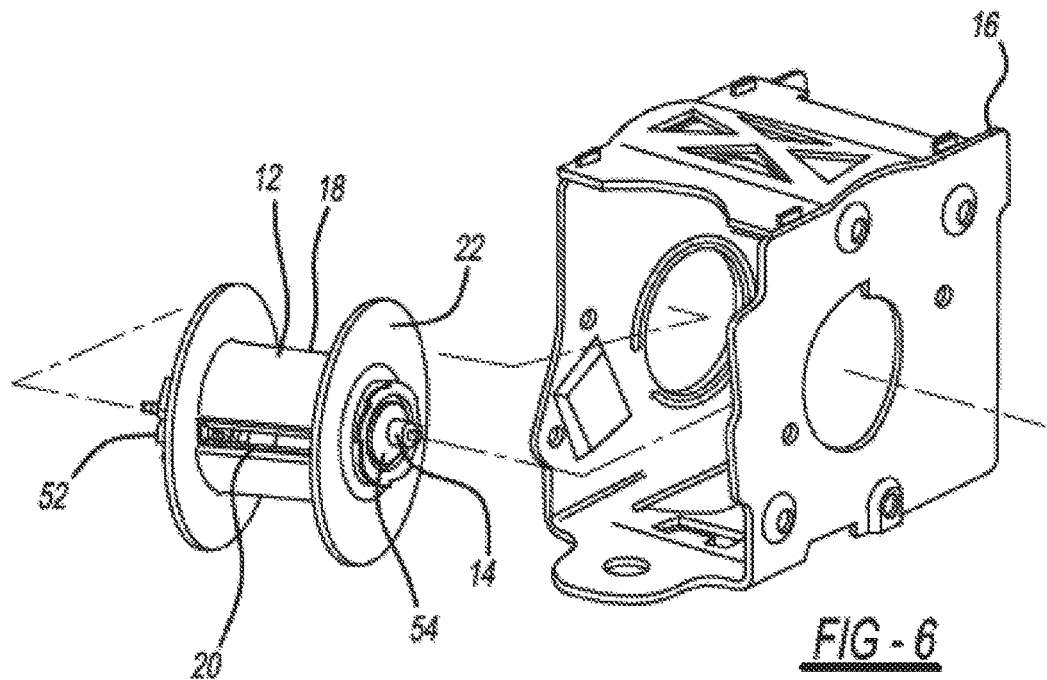
FIG. 6 is a perspective view of a partially assembled seatbelt retractor of FIG. 1.
Figure 10A:
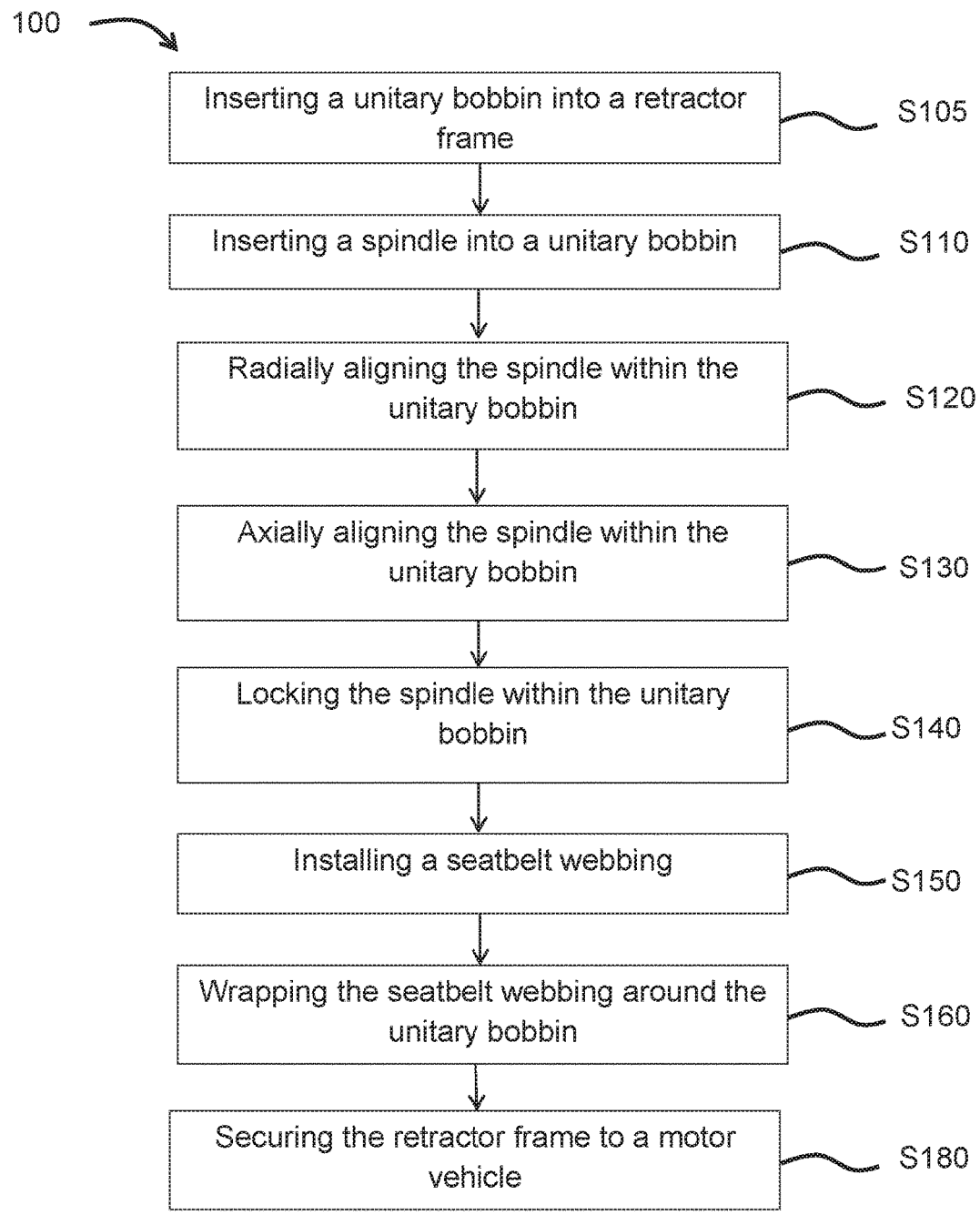
FIG. 10A shows a flowchart the method of FIG. 9 including additional assembly steps according to an embodiment of the present invention.
Figure 10B:
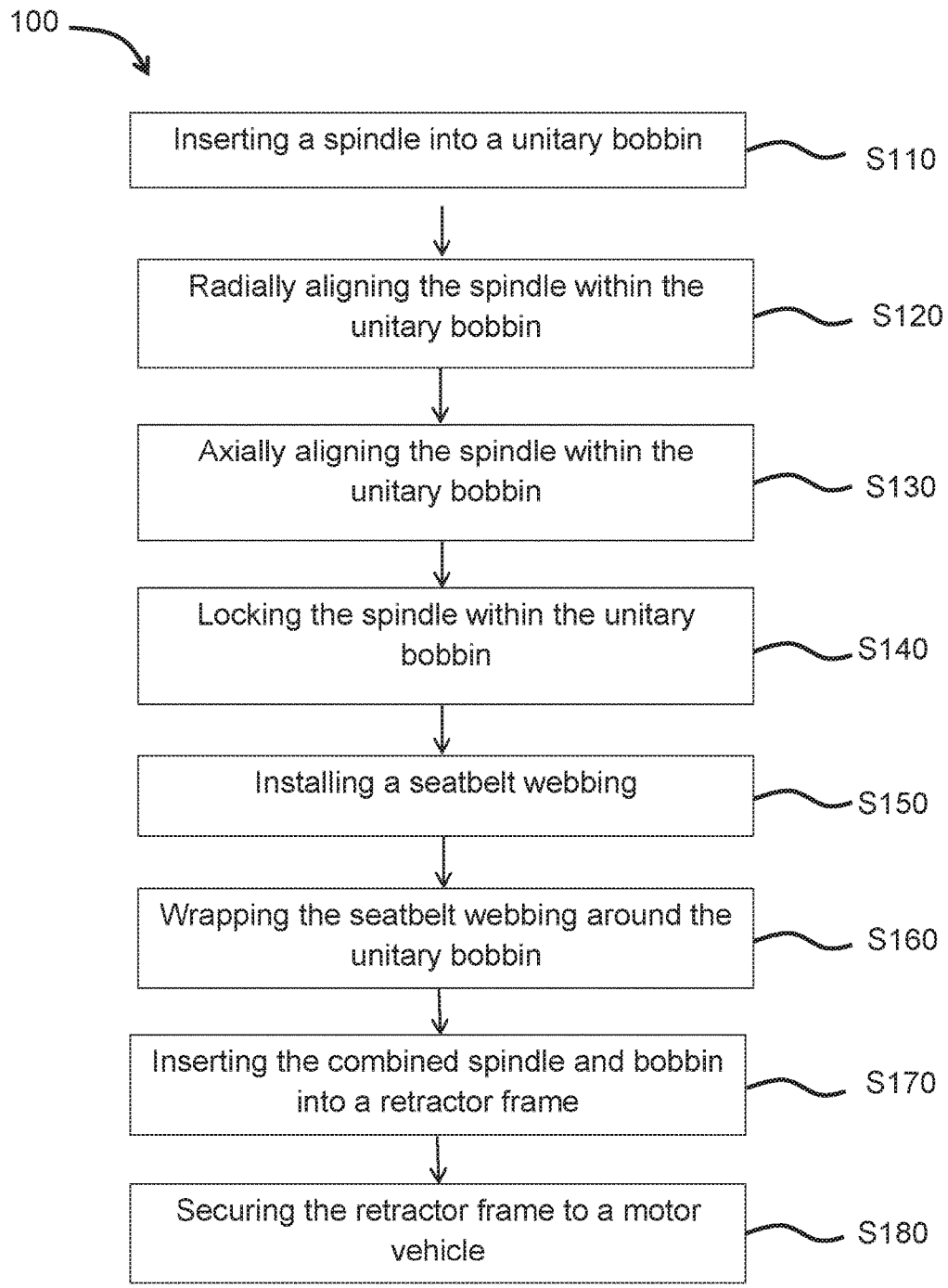
FIG. 10B shows a flowchart of the method of FIG. 9 including additional assembly steps according to yet another embodiment of the present invention.

As shown in FIG. 10A, the method 100 may further include inserting the unitary bobbin 12 into a retractor frame 16 before inserting the spindle 14 into the unitary bobbin 12 at step S105. According to this embodiment of the method, once the unitary bobbin 12 is placed within the retractor frame 16, the spindle 12 is inserted into the mounting portion 18 of the unitary bobbin 12 as described above by first passing through an opening in the retractor frame 16. When the spindle 14 is installed in the unitary bobbin 12, the first and second ends 52 and 54 of the spindle 14 are mounted to the retractor frame 16 and may protrude through openings in the retractor frame 16. Alternatively, as shown in FIG. 10B and FIG. 6, the method may further include inserting the combined spindle 14 and bobbin 12 into a retractor frame 16 and mounting the spindle 14 to the retractor frame 16 such that the unitary bobbin 12 is rotatable with respect to the retractor frame 16 at step S170. The method 100 may conclude with securing the retractor frame 16 to a motor vehicle (not shown) at step S180.

It is to be understood that the invention has been described with reference to specific embodiments and variations to provide the features and advantages previously described and that the embodiments are susceptible of modification as will be apparent to those skilled in the art. Variations that do not depart from the substance of the disclosure are intended to be within the scope of the disclosure. Such variations are not to be regarded as a departure from the spirit and scope of the disclosure.

What is claimed is:

1. A motor vehicle seatbelt retractor comprising:
a unitary bobbin having a mounting portion defining a webbing slot, a first annular wall extending perpendicularly from a first end of the mounting portion; and a second annular wall extending perpendicularly from a second end of the mounting portion;
a spindle extending through the mounting portion of the unitary bobbin; and
a retractor frame to which the spindle is mounted;
wherein the unitary bobbin is rotatable with respect to the retractor frame and an outer surface of the unitary bobbin is configured to be wrapped with a seatbelt webbing.

2. The seatbelt retractor of claim 1, further comprising an anti-rotation feature on an interior surface of the mounting portion of the unitary bobbin to align a webbing slot in the spindle with the webbing slot in the bobbin during assembly of the retractor and to prevent rotation of the spindle relative to the bobbin during use of the retractor.

3. The seatbelt retractor of claim 2, wherein the anti-rotation feature comprises a groove on the interior surface of the mounting portion and a corresponding tongue on an exterior surface of the spindle.

4. The seatbelt retractor of claim 1, further comprising at least one recessed surface on the first annular wall of the unitary bobbin corresponding to a mating surface on the spindle to axially align the spindle within the unitary bobbin.

5. The seatbelt retractor of claim 1, further comprising a snap feature at the second end of the mounting portion of the bobbin to secure the spindle within the bobbin.

6. The seatbelt retractor of claim 5, wherein the snap feature comprises at least one ridge extending from an interior surface of the mounting portion that snaps into a corresponding groove on the spindle.

7. The seatbelt retractor of claim 1, wherein an interior surface of the mounting portion of the bobbin is helical.

8. The seatbelt retractor of claim 1, wherein the seatbelt webbing is inflatable.

9. A motor vehicle seatbelt retractor comprising:
a unitary bobbin having a mounting portion defining a webbing slot;
a first annular wall extending radially outward and perpendicularly from a first end of the mounting portion; and
a second annular wall extending radially outward and perpendicularly from a second end of the mounting portion;
wherein an interior surface of the mounting portion defines an anti-rotation feature, the first annular wall defines at least one recessed surface, and a snap feature protrudes from the interior surface at the second end of the mounting portion.

10. The seatbelt retractor of claim 9 further comprising a spindle positioned within the mounting portion of the unitary bobbin such that an outer surface of the spindle is in contact with the interior surface of the mounting portion.

11. The seatbelt retractor of claim 10 further comprising a retractor frame to which the spindle is mounted, wherein the unitary bobbin is rotatable with respect to the retractor frame.

12. The seatbelt retractor of claim 10, wherein the anti-rotation feature is a groove in the interior surface of the mounting portion configured to receive a corresponding tongue protruding from the outer surface of the spindle, wherein cooperation of the groove and the tongue align a webbing slot in the spindle with the webbing slot in the bobbin during assembly of the retractor and prevents rotation of the spindle relative to the bobbin during use of the retractor.

13. The seatbelt retractor of claim 10, wherein the recessed surface is configured to receive a corresponding mating surface on the spindle to axially align the spindle within the unitary bobbin.

14. The seatbelt retractor of claim 10, wherein the snap feature comprises at least one ridge extending from the interior surface of the mounting portion that snaps into a corresponding groove on the outer surface of the spindle to secure the spindle within the unitary bobbin.

15. A method of assembling a motor vehicle seatbelt retractor, the method comprising:
inserting a first end of a spindle into a first end of a mounting portion of a unitary bobbin toward a second end of the mounting portion of the bobbin;
radially aligning a spindle webbing slot with a bobbin webbing slot by inserting a tongue formed on an exterior surface of the spindle into a groove formed on an interior surface of the mounting portion;
axially aligning the spindle within the mounting portion of the unitary bobbin by nesting a mating surface of the spindle into a recess in a first annular wall that extends perpendicularly from the first end of the mounting portion of the bobbin; and
locking the spindle axially within the mounting portion of the unitary bobbin by snapping a ridge that extends from the interior surface of the mounting portion into a corresponding groove on an exterior surface of the spindle.

16. The assembly method of claim 15, wherein the cooperation of the tongue formed on the exterior surface of the spindle and the groove formed on the interior surface of the mounting portion prevents the spindle from rotating relative to the unitary bobbin.

17. The assembly method of claim 15, further comprising installing a seatbelt webbing by passing the seatbelt webbing through the spindle webbing slot and the bobbin webbing slot, and securing a first end of the seatbelt webbing within the spindle.

18. The assembly method of claim 15, further comprising inserting the unitary bobbin into a retractor frame before inserting the spindle into the mounting portion of the unitary bobbin.

19. The assembly method of claim 17, further comprising wrapping the seatbelt webbing around an outer surface of the mounting portion of the unitary bobbin, and wherein the wrapped seatbelt webbing is bordered by the first annular wall that extends perpendicularly from the first end of the mounting portion and by a second annular wall that extends perpendicularly from the second end of the mounting portion of the bobbin.

20. The assembly method of claim 15, further comprising mounting the spindle to a retractor frame.

* * * * *